United States Patent
Sepper

[15] 3,654,599
[45] Apr. 4, 1972

[54] VEHICLE STEERING REVERSAL RATE ALARM SYSTEM

[72] Inventor: Werner Sepper, Concord, Calif.
[73] Assignee: Life Technology, Inc.
[22] Filed: Apr. 10, 1970
[21] Appl. No.: 27,410

[52] U.S. Cl. ............................................. 340/52, 340/279
[51] Int. Cl. .................................................. G08b 21/00
[58] Field of Search .................. 340/52, 53, 279, 54; 180/82, 180/82.7

[56] References Cited

UNITED STATES PATENTS

| | | | |
|---|---|---|---|
| 3,222,640 | 12/1965 | Wurst | 340/279 X |
| 3,227,998 | 1/1966 | Platt | 340/279 X |
| 2,875,430 | 2/1959 | Kayser, Jr. | 340/279 X |

Primary Examiner—Alvin H. Waring
Attorney—Limbach, Limbach & Sutton

[57] ABSTRACT

Pulses, generated by every reversal of a vehicle's steering wheel are counted during a fixed time period to determine a reversal rate when the vehicle exceeds a minimum speed. That rate is stored and a voltage proportional to the rate is used to control the pulse width of subsequent reversal pulses that are applied to a capacitor charging circuit having a long time constant. A high capacitor voltage activates a high reversal rate alarm and a low capacitor voltage activates a low reversal rate alarm.

12 Claims, 6 Drawing Figures

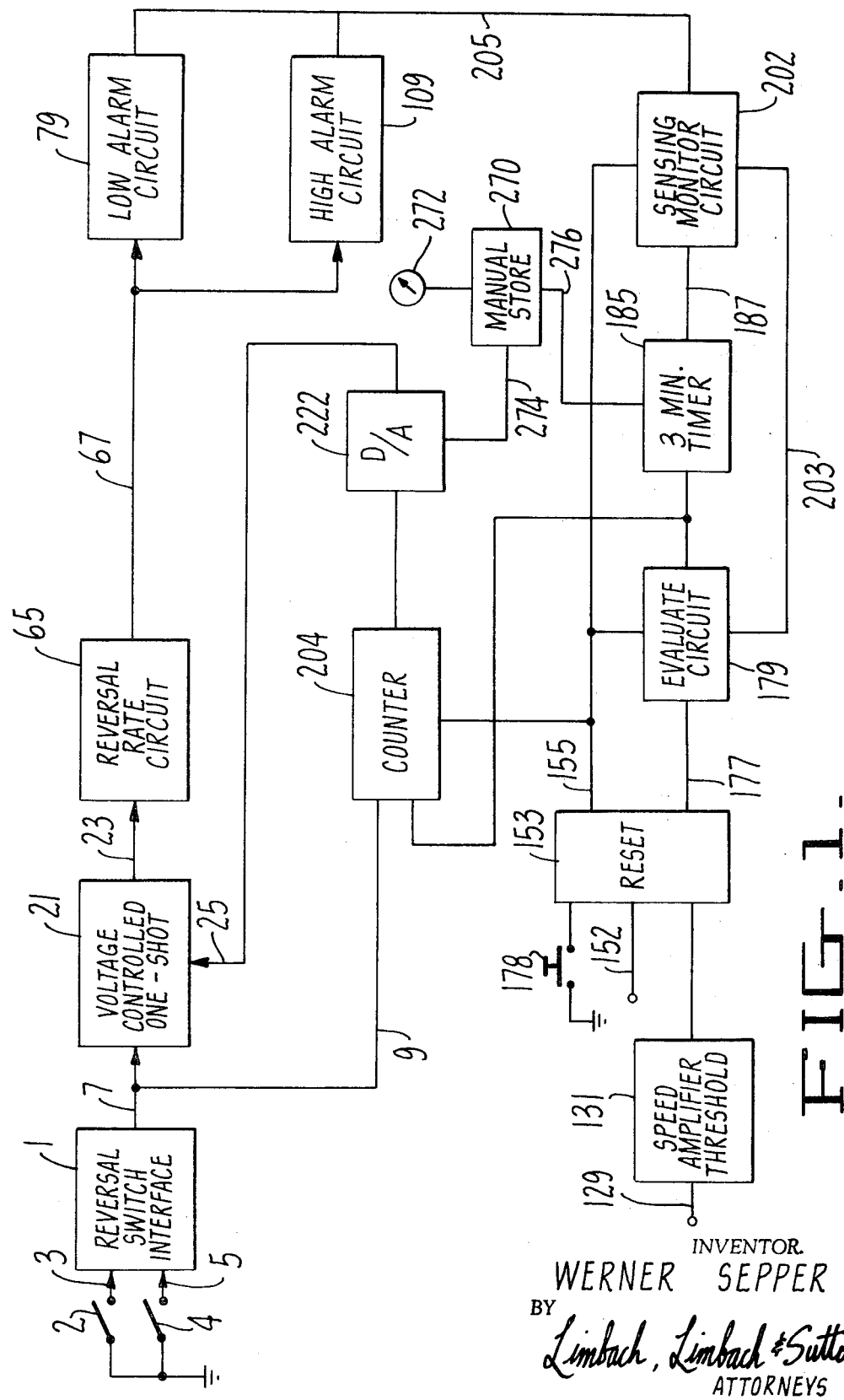

INVENTOR.
WERNER SEPPER

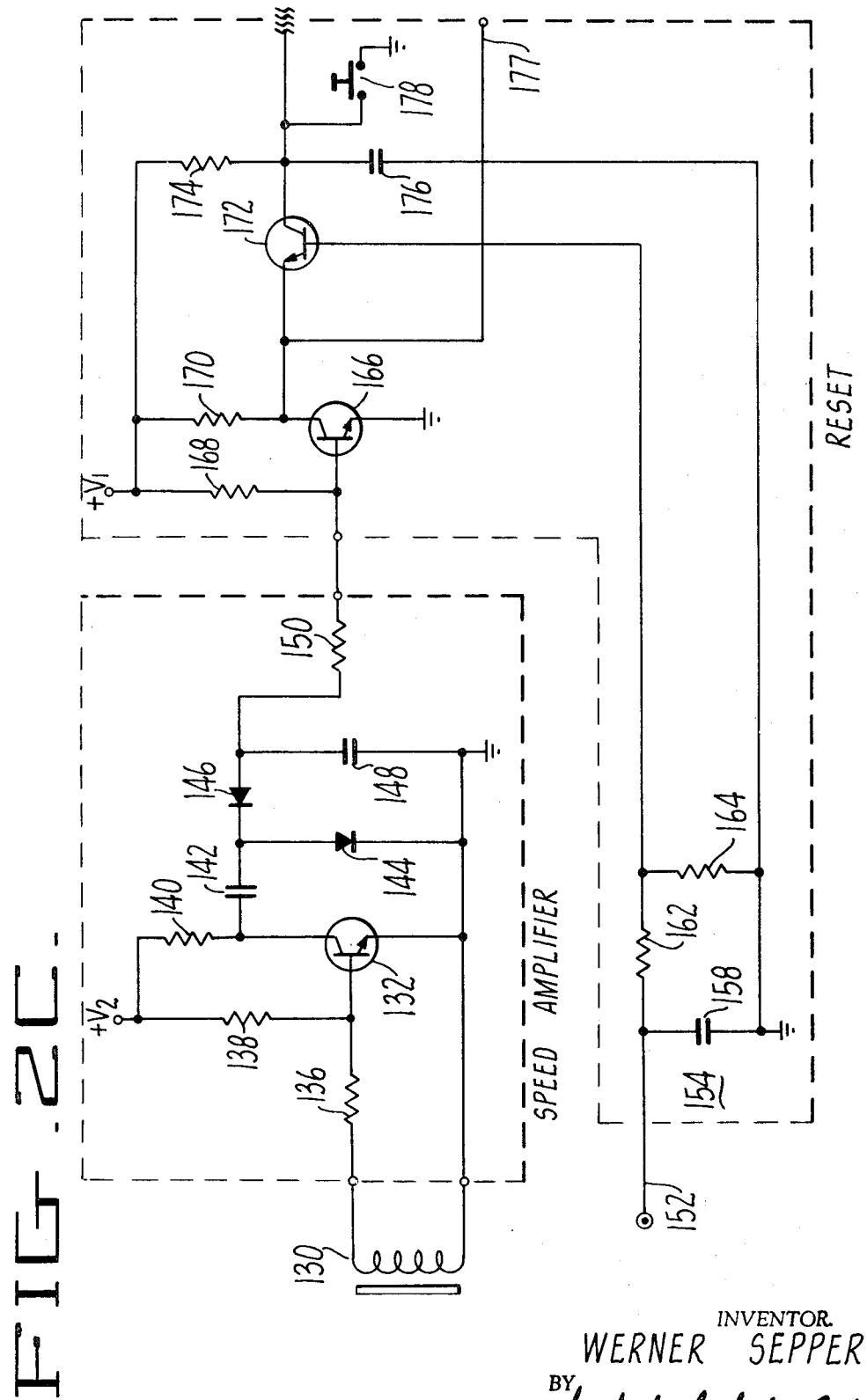

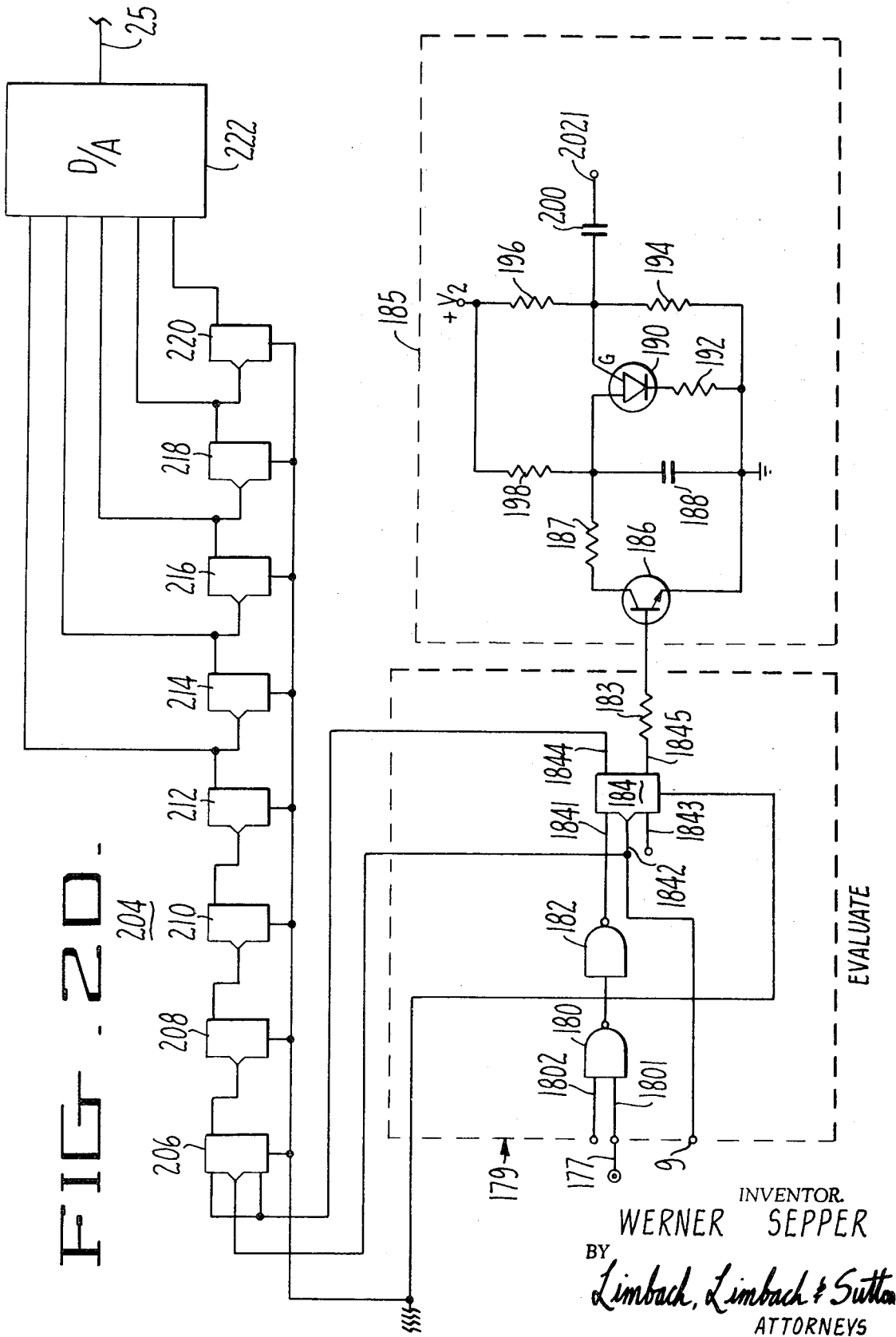

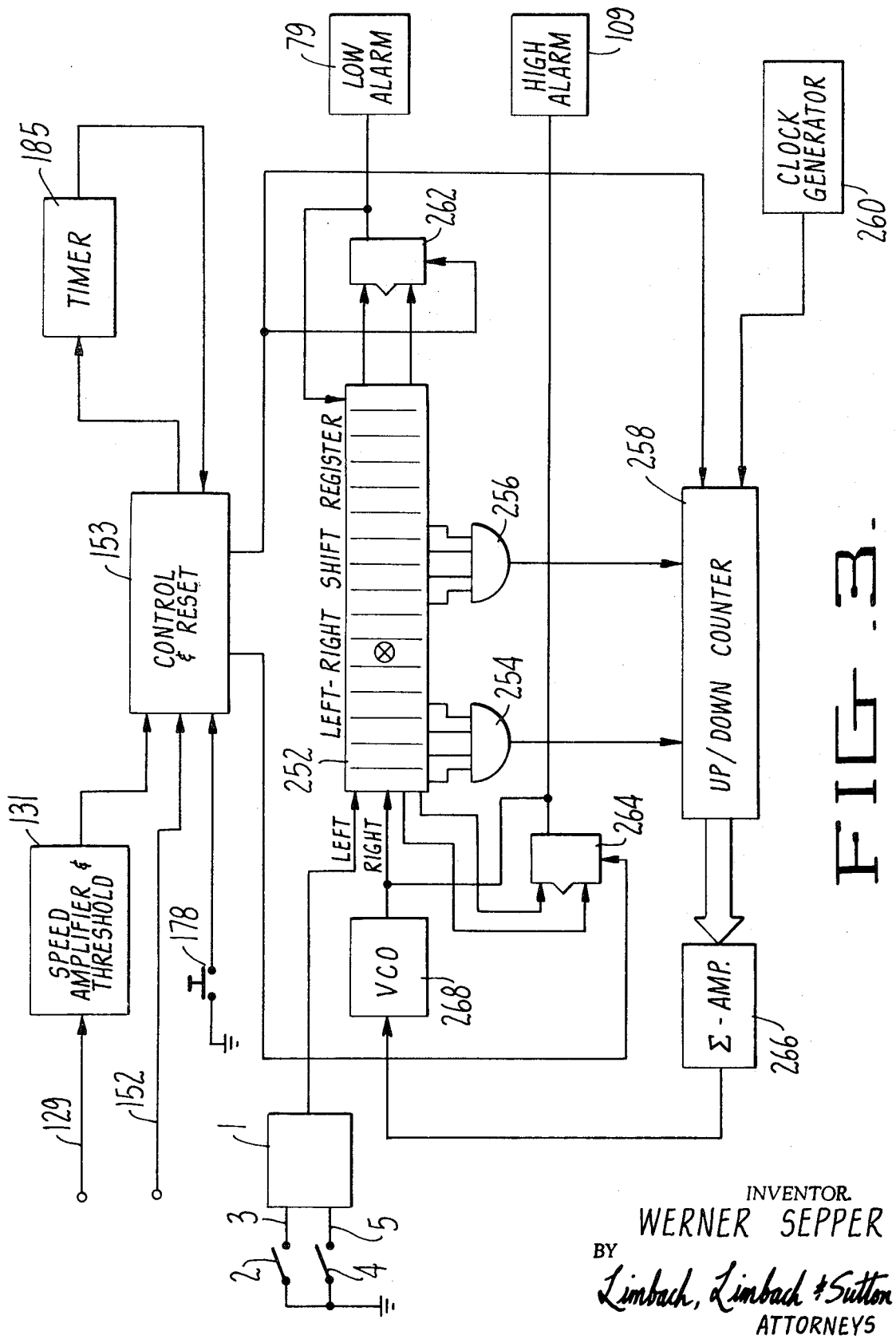

VEHICLE STEERING REVERSAL RATE ALARM SYSTEM

BACKGROUND OF THE INVENTION

This invention relates generally to a vehicle safety device and more particularly to an automatic driver alertness or attention indicator or aid.

Research in driver characteristics has shown that a useful indicator of driver attentiveness is the rate of steering wheel reversals. A reversal is a change of rotation from clockwise to counterclockwise or vice versa and is the result of a volitional, but not necessarily conscious, muscular movement by the driver to control the tracking of the vehicle. It has been found that a given driver tends to maintain a fairly constant steering wheel reversal rate. In the event of adverse traffic or highway conditions, the driver tends to adjust the vehicle speed in order to achieve a comfortable reversal rate. If the vehicle operator is driving too fast for road conditions, is engaged in conversations with passengers or is following another vehicle too closely thereby tracking an object close to the front of his car instead of tracking a long distance down the road, his reversal rate will tend to be higher than his normal rate. On the other hand if the vehicle operator becomes sleepy, hyptonized by the road conditions, or intoxicated, the reversal rate will tend to drop below his normal rate. Indeed, it has been found that the decrease in reversal rate is a precursor of the above-mentioned conditions and correlates with physiological changes taking place in the driver.

In U.S. Pat. No. 3,227,998 issued to Fletcher N. Platt on Jan. 4, 1966, electrical pulses of constant width are generated in response to the steering wheel reversals and are used to charge a capacitor. The capacitor voltage is monitored to provide an indication of the reversal rate. In order to be adapted to the normal reversal rate of each individual driver, a voltage divider across the capacitor must be manually adjusted. A single warning device having manually adjusted high and low thresholds then monitors the voltage divider output. In order to calibrate the voltage divider to the individuals normal reversal rate, a meter must be observed by the driver for several minutes and a control must be adjusted to center the meter reading. In order for the unit to be effective, the calibration should be performed at the beginning of each trip when the driver is most alert. One drawback of this procedure is that the driver is distracted from concentrating on the road ahead, and, moreover, unless this driver is very conscientious, the calibration procedure will become a nuisance and will be omitted, rendering the unit ineffective. Even if the driver makes the required adjustments, his doing so requires him to take one hand from the wheel thus increasing his reversal rate and causing an unstable positive feedback effect. Once calibrated, the unit's sensitivity (high and low alarm threshold) must also be manually set.

SUMMARY OF THE INVENTION

The automatic driver attention aid of the present invention is designed to overcome these difficulties by automatically sampling the average steering wheel or steering member reversal rate for a predetermined time at the beginning of each trip thereby adjusting to each individual driver. That average rate is remembered for the remainder of the trip, and is continuously checked against the driver's dynamic reversal rate and separate and distinctive alarms are actuated when the rate exceeds or falls below a preset percentage of the stored rate level; thresholds are not set manually by the operator. The unit automatically determines when the vehicle is driven in stop and go traffic, and under these conditions no averaging is performed and no alarms are sounded. The unit, however, operates when the vehicle is moving slowly such as ascending a steep grade.

In one preferred embodiment of the invention a straight binary counter counts the number of steering wheel reversals during a fixed time period thus determining a reversal rate (r-eversals per a given time). The counting is initiated only after the vehicle exceeds a minimum speed and thereafter does not brake while going below that speed. At the end of the time period counting is stopped, but the count is held and is converted to an analog voltage. That voltage is a memory function indicating the reversal rate that subsequent rates will be compared against. Pulses generated by each steering wheel reversal are varied in length depending on the analog voltage. For a high voltage, indicating a high reversal rate in the memory, the pulses will have a narrow width and for a low voltage, a wider width. Whatever pulse width results from the stored count will remain constant until the system is reset. The pulses are then applied to charge a capacitor circuit having a time constant of about 20 seconds. Because the pulses have a width dependent on the analog voltage, the capacitor charging voltage will always be the same voltage as long as the dynamic reversal rate is the same as the rate during the three minute sampling period. This will be true for any stored rate because the charging voltage depends on pulse rate and pulse width and larger stored pulse rates have narrower pulse widths and vice-versa. If however, the driver's reversal rate begins to exceed his stored rate, the capacitor charging voltage will slowly begin to rise and when a maximum voltage threshold is exceeded an alarm may be activated. Likewise, if his rate drops, the capacitor voltage will drop and can activate another alarm. The same average maximum, and minimum voltage charge levels apply for any stored rate and for any driver. Thus the unit is completely automatic and requires no operator adjustment. The operator does have the option, however, of resetting the unit in order to store a new reversal rate into the unit should he believe his initial stored rate is erroneous for some reason such as extreme road conditions.

In another embodiment a digital version of the device is disclosed. The initial reversal rate is stored in a counter operating with a left-right shift register. Functionally, the shift register replaces the capacitor charge/ discharge circuit. The stored rate shifts the register one direction and the dynamic rate shifts it in the opposite direction. Thus the ends of the register provide an indication of high and low reversal rates.

BRIEF DESCRIPTION OF THE DRAWINGS

FIG. 1 is a block diagrammatical view of an embodiment of the automatic driver attention aid according to the present invention.

FIGS. 2A–2D are schematic circuit diagrams of the embodiment shown in FIG. 1.

FIG. 3 is a block diagrammatical view of an alternative embodiment of the automatic driver attention aid according to the instant invention.

DESCRIPTION OF THE PREFERRED EMBODIMENTS

Figure 2A:
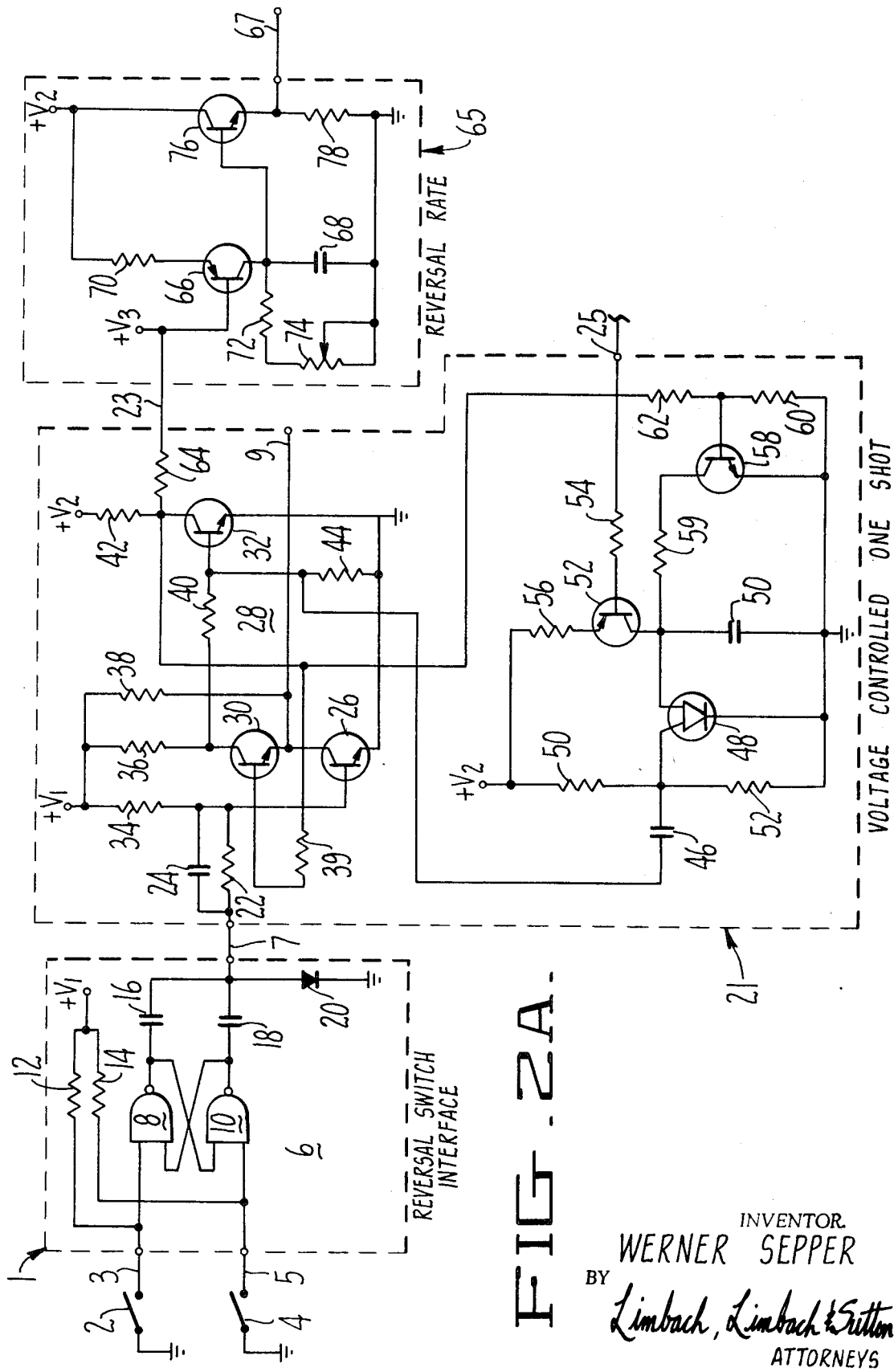

Referring now to FIG. 1 of the drawings, a first single pole single throw (SPST) switch 2 and a second SPST switch 4 are arranged to connect lines 3 and 5, respectively, to ground. Lines 3 and 5 are provided as inputs to a reversal switch interface 1 that provides a single pulse output in response to consecutive closures of switches 2 and 4 in either order. Switches 2 and 4 would ordinarily be a steering wheel reversal switch, which provides closure of one circuit path when the steering wheel is rotated clockwise and closure of a second circuit path when the steering wheel is rotated counterclockwise. Thus a pulse is produced by reversal switch interface 1 on line 7 whenever the steering wheel is reversed or rotated from clockwise to counterclockwise or vice versa. The pulses on line 7 are applied both to a voltage controlled one shot (V-COS) 21 and to a counter 204. The counter will be discussed in greater detail hereinafter. The voltage controlled one shot 21 provides a pulse of variable width on line 23 in response to each input pulse on line 7. The pulse widths are controlled by the control voltage input to the VCOS on line 25 as will be explained hereinafter; the voltage on line 25 remains constant over a substantial period of time, thus the pulses on line 23 have a fixed pulse width over that time period. The pulses are also of a constant amplitude for any pulse width. A reversal rate circuit 65 receives the pulses on line 23 and provides generally a capacitor charging and discharging function. Depending on the repetition rate of the pulses on line 23, the capacitor will charge to a particular average voltage level. The capacitor circuit is chosen to have a fairly long time constant, on the order of 20 seconds, for example. Thus, as the pulse rate increases, the capacitor voltage will increase above an average charging voltage and as the rate decreases the capacitor voltage will drop below an average charge voltage. As will become apparent from the further discussion hereinafter, a predetermined maximum and minimum desired charging voltage may be chosen which has a direct relationship to the rate of steering wheel reversals. The capacitor charging voltage on line 67 is applied to a low alarm circuit 79 and to a high alarm circuit 109. The low alarm circuit 79 has a fixed threshold set at the minimum desired charging voltage and the high alarm circuit has a fixed threshold set at the maximum desired charging voltage. The high and low alarm circuit are enabled only when certain conditions of operation have been met as described hereinafter.

Pulses from reversal switch interface 1 on line 7 are also received by counter 204 which may be, for example, a straight 8-bit BCD (binary coded digit) counter having a maximum count of 256. Counter 204 provides an output in parallel to a digital to analog (D/A) converter 222 that provides a control voltage on line 25 to the VCOS 21. As will be described in more detail hereinafter, the counter 204 is enabled only for an initial 3 minute period and the count made during that 3 minute period is held until the system is reset, thus providing a constant control voltage on line 25.

A speed amplifier and threshold control 131 receives a signal on line 129, the frequency of which varies in accordance with the speed of the vehicle. The circuit amplifies the speed signal and provides an output only when the vehicle speed exceeds a predetermined minimum, for example 35 mph. Upon exceeding the predetermined speed, an enable signal is applied on line 177 to an evaluate circuit 179 that consists generally of a JK flip flop. Thus when an enable signal is present on line 177 the evaluate circuit 179 enables counter 204 to begin counting pulses and also activates 3 minute timer 185. The 3 minute timer provides an enable output on line 187 to a sensing monitor circuit 202 that consists generally of another JK flip flop. Upon being set by the signal on line 187, circuit 202 resets the evaluate circuit 179 over line 203 and also enables low alarm circuit 79 and high alarm circuit 109 via line 205. Upon being reset, evaluate circuit 179 disables but does not reset counter 204 thus holding the count present in counter 204 indefinitely. A reset circuit 153 receives inputs over the vehicle's brake light circuit on line 152 and also from a reset switch 178. Upon closure of reset switch 178 a reset pulse is applied on line 155 to counter 204, which resets the counter to a count of 0; to the evaluate circuit 179, which resets the evaluate flip flop; and to the sensing monitor circuit 202, which resets the sensing monitor flip flop thereby disabling the low and high alarm circuits. The circuit is thus returned to its initial 0 state and will remain there until a speed over the predetermined minimum is registered on line 129. A signal on line 152 is received upon braking of the vehicle. A signal on line 152 has no effect if the vehicle at that moment is going in excess of 35 mph; however, if it is going less than 35 mph, the reset circuit 153 acts in the same manner as though the reset switch 178 has been closed.

Thus in operation, there are two distinct modes and a reset function.

The Evaluate Mode

This mode is initiated when the vehicle exceeds a predetermined speed such as 35 mph. The evaluate circuit 179 enables counter 204 and 3 minute timer 185 thus permitting the counter to register the number of steering wheel reversals that occurs during the 3 minute period The Sensing Mode This mode is initiated at the end of the 3 minute time period, the evaluate circuit 179 is switched thus stopping any further counting in counter 204 but holding the final count. The high and low alarm circuits 79 and 109 are enabled and the BCD output of counter 204 goes to the D/A converter 222 to provide an analog voltage on line 25 to the VCOS 21 to control pulse width on line 23. The larger the count in 204, the shorter the pulse on line 23. The VCOS pulses on line 23 charge a capacitor circuit and the reversal rate circuit 65 and when the capacitor charge exceeds a predetermined maximum voltage high alarm 109 is triggered; if it goes below a minimum voltage the low alarm 79 is triggered.

Reset

The unit is not reset upon going below a predetermined speed but is reset if braking is applied when the vehicle is going below the predetermined speed. The reset switch 178 always is available to reset the unit. Upon resetting by either of the above methods the counter 204 is reset to 0, the flip flop and evaluate circuit 179 is reset and the flip flop and monitor circuit 202 is reset thus disabling the high and low alarm circuits. If desired, the unit could be designed so that reset is accomplished solely by braking or solely by going below a predetermined speed.

Optionally, a manual store unit 270 having a hand adjustable control 272 may be used to replace the step of the evaluate mode. This option works as follows: a driver is tested under normal conditions to determine his normal average reversal rate. This could be done with circuitry of the type disclosed herein, with the addition of a means for reading the reversal rate determined during the evaluate mode. The driver thereafter knowing his normal reversal rate (which stays relatively constant over long periods of time) could opt to insert it manually by adjusting control 272 and bypassing the counter 204. If control 272 is thus, set, the timer 185 is inhibited by line 276 and the D/A converter 222 is controlled over line 274 to provide the signal on line 25 corresponding to the reversal rate set by control 272. The unit would function in all other respects as though the rate set by control 272 had been stored in counter 204 during the evaluate mode. This option would be particularly desirable if the driver believed himself to be unable to achieve an accurate rate during the evaluate mode because of drowsiness or intoxication. He would thus have an indication of his capacity to safely operate the vehicle.

Figure 2B:
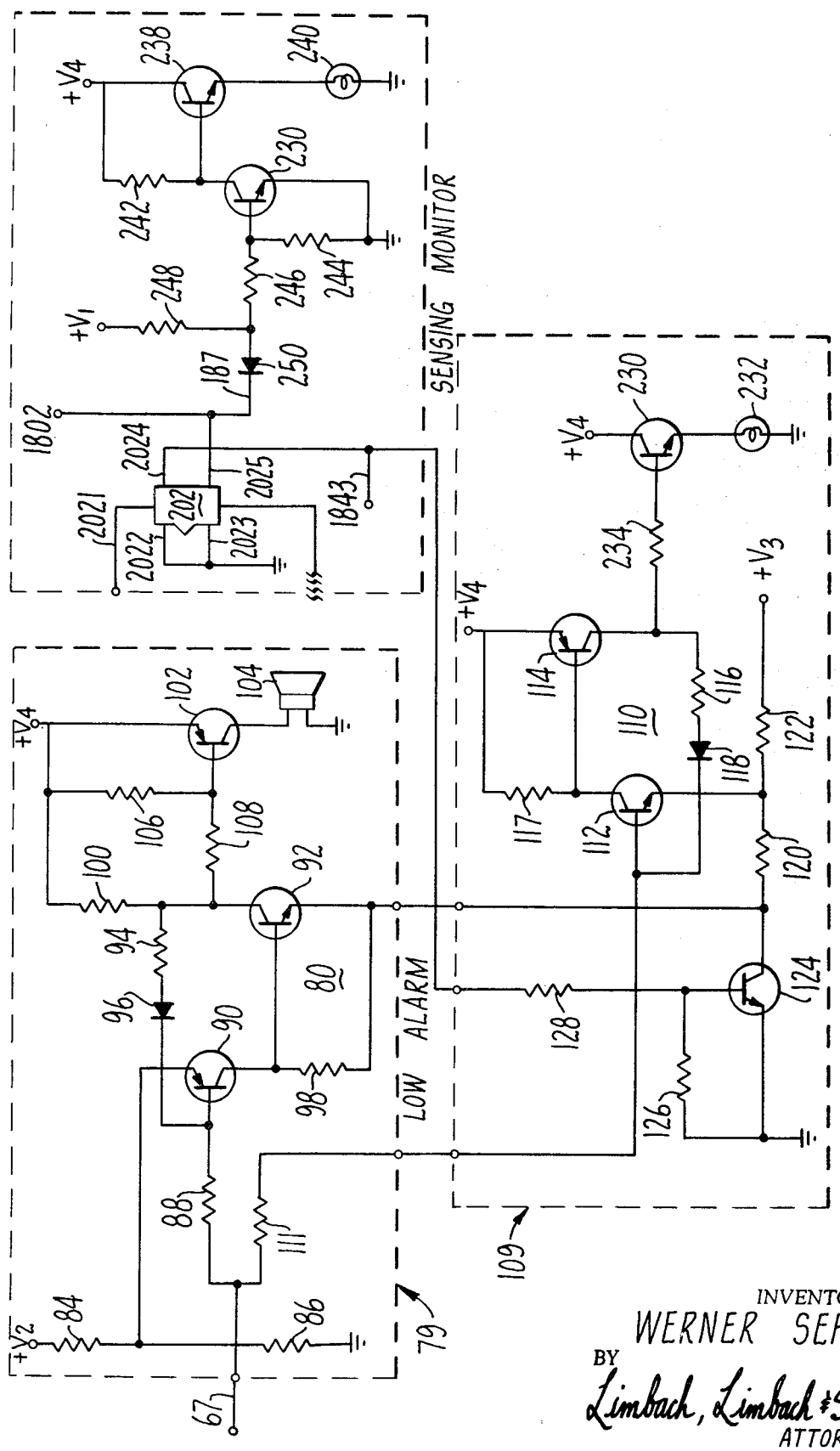

Reference is now made to FIGS. 2A–2D of the drawings wherein a schematic circuit diagram of the embodiment described in FIG. 1 is shown in some detail. Whenever possible, the same reference numerals are carried throughout the various figures. FIG. 2 will be described in the same order as FIG. 1 for clarity.

REVERSAL SWITCH INTERFACE

The reversal switch interface 1 includes an RS flip flop 6 consisting of a pair of NAND gates 8 and 10 conventionally connected. Switch 2 is connected between one input of NAND gate 8 and ground and switch 4 is connected between one input of NAND gate 10 and ground. The remaining inputs to each NAND gate are connected to the output of the other NAND gate. Each NAND gate output is further connected, respectively, to differentiating capacitors 16 and 18. The capacitors 16 and 18 are connected together to an anode of a diode 20 which has its cathode connected to ground. The inputs of NAND gates 8 and 10 that are connected to switches 2 and 4 are further connected respectively through dropping resistors 12 and 14 to a positive voltage source $v_1$. The reversal switch interface thus operates as follows, assuming that gate 8 is in its high state, then gate 10 is in its low state, and closure of switch 4 will have no effect on the outputs of gates 8 and 10. However, closure of switch 2 will cause the gates to flip making the output of gate 10 to go high and the output of gate 8 to go low. Thus once one of the switches is closed the flip flop does not switch until the opposite one recloses. Therefore, if one of the switches is arranged to close upon rotation of the steering wheel in a clockwise direction and the other switch is arranged to provide closure when the steering wheel is rotated in the opposite direction, the flip flop will switch only upon a reversal of the steering wheel direction. In addition, the interface also acts as a contact filter in that once set it does not matter if the contact of the switch which closed last makes further contacts due to contact bounce, for example. Differentiating capacitors 16 and 18 provide a sharp negative spike whenever the flip flop changes conditions. The diode 20 operates to pass any positive signals to ground. Thus the output of interface 1 consists of sharp negative spikes which occur at each steering wheel reversal.

VOLTAGE CONTROL ONE SHOT

The output of interface 1 is applied to the VCOS 21 through a parallel resistor 22 and capacitor 24. The resistor and capacitor provide coupling and a speed up of the spike wave form in order to achieve faster operation of the transistors in the VCOS circuit. The signal for the resistor and capacitor is applied to the base of an NPN transistor 26 having its emitter connected to ground and having its collector connected to an RS flip flop 28. Transistor 26 has its base connected to a positive voltage source $v_1$ through a biasing resistor 34. Flip flop 28 consists of a pair of transistors 30 and 32, the emitter of transistors 30 is connected to the collector of transistor 26; the base of transistor 30 is connected through a coupling resistor 39 to the collector of transistor 32. The collector, of transistor 30 is connected through a coupling resistor 40 to the base of transistor 32 and through a biasing resistor 36 to the voltage source $+v_1$. The emitter of transistor 30 is also connected through a biasing resistor 38 to the voltage source $+v_1$ and is further connected, as will be explained hereinafter, to the toggle input of evaluate circuit flip flop 184. The emitter of transistor 32 is connected to ground, the base of transistor 32 is connected through a biasing resistor 44 to ground and is further connected to a capacitor 46. As will be explained below, a negative spike is obtained through capacitor 46 in order to switch flip flop 28. The emitter of transistor 32 is connected through a biasing resistor 42 to a positive voltage source $+v_2$ and is further connected through a resistor 62 to the base of an NPN transistor 58. The base of transistor 58 is further connected through a divider resistor 60 to ground and the emitter of transistor 58 is also connected to ground; the collector is connected through a resistor 59 and a capacitor 50 to ground. The junction of resistor 59 and capacitor 50 is further connected to the anode of a programmable unijunction transistor 48 and to the collector of a constant current source PNP transistor 52. The emitter of transistor 52 is connected through resistor 56 to voltage source $+v_2$. As will be explained in more detail hereinafter the base of transistor 52 receives a constant voltage on line 25 through resistor 54. Thus the voltage on line 25 determines the current supplied by the constant current source transistor 52 to charge capacitor 50. Transistor 58 acts as a switch across capacitor 50; when a reversal pulse is received from interface 1 transistor 32 of flip flop 28 saturates thus turning off transistor 58 and allowing capacitor 50 to charge. Unijunction transistor 48 has its cathode connected to ground and its gate input connected to a pair of voltage dividing resistors 50 and 52 connected between a voltage source $+v_2$ and ground and the capacitor 46 is connected to the junction of the resistors and to the gate input of unijunction transistor 48. Resistors 50 and 52 set a threshold voltage for unijunction transistor 48 and upon the voltage on capacitor 50 reaching the threshold voltage, the unijunction transistor will fire discharging capacitor 50 and providing a sharp negative pulse through capacitor 46 to the base of transistor 32 thereby switching flip flop 28. Upon receipt of a further reversal switch pulse from interface 1 the same process will repeat itself: flip flop 28 will switch saturating transistor 32 turning transistor 58 off to allow charging of capacitor 50 from the constant current source 52 and permitting discharge through the unijunction transistor 48 when the threshold voltage is reached. The collector of transistor 32 is therefore a pulse of varying widths depending for its pulse width on the voltage applied on line 25 to the constant current source 52.

REVERSAL RATE CIRCUIT

The output of the VCOS 21 circuit is taken through a coupling resistor 64 and is applied to the base of a constant current source PNP transistor 66. The base of transistor 66 is also connected to a positive voltage source $+v_3$. The emitter of transistor 66 is connected through a resistor 70 to voltage source $+v_2$. The collector of the transistor 66 is connected to a network including a capacitor 68 connected between the collector and ground and a series connection of resistors 72 and a potentiometer 74 connected between the collector and ground. The rider of the potentiometer 74 is connected to ground thus providing a variable resistance. Because the pulse produced at the output of VCOS 21 is a negative pulse, the constant current source 66 will be conducting when the pulse is present thus charging capacitor 68. Resistor 72 and potentiometer 74 provide a discharge path for the capacitor having approximately a 20 second time constant. The voltage charge on capacitor 68 provides an indication of whether the steering wheel reversal rate is above or below the normal value. Adjustment of potentiometer 74 allows a scaling adjustment to compensate for any variations in the timer or in other circuit parameters. The capacitor voltage is coupled to the base of an NPN transistor 76 functioning as a high impedance amplifier. The collector of the transistor 76 is connected to voltage source $+v_2$ and the emitter is connected through biasing resistor 78 to ground. The amplifier output is taken at the emitter of transistor 76 and is applied to the low alarm 79 circuit and the high alarm circuit 109.

LOW ALARM CIRCUIT

The output from reversal rate circuit 65 is applied to the base of a PNP transistor 90 that forms a portion of a Schmitt trigger circuit 80. The emitter of transistor 90 is connected to the junction of series bias resistors 84 and 86 that are connected between voltage source $+v_2$ and ground. When the voltage applied to the base of transistor 90 is lower than the fixed voltage applied to the emitter of transistor 90 the collector of the transistor will go low. The collector of transistor 90 is connected to the base of NPN transistor 92 which also forms a part of the Schmitt trigger and is connected through resistor 98 to the emitter of transistor 92. The base of transistor 90 is further connected to the cathode of diode 96 which has its anode connected through resistor 94 to the collecter of transistor 92; the collector of transistor 92 is connected through a resistor 100 to voltage source $+v_4$ and is further connected through resistor 108 to the base of PNP amplifying transistor 102. The base of transistor 102 is further connected through resistor 106 to voltage source $+v_4$ and the emitter of transistor 102 is also connected to voltage $+v_4$. The collector of amplifying transistor 102 is connected to an alarm device such as an electroacoustic transducer 104. The emitter of transistor 92 is connected to the collector of a switching transistor 124 that functions to enable or disable the alarm circuit. Transistor 124 has its emitter connected to ground, thus when the transistor is on a path to ground is provided for transistors 90 and 92 and the low alarm is thus enabled. If the alarm is enabled, then a voltage output from reversal rate circuit 65 lower than the voltage at the junction of threshold resistors 84 and 86 will cause the low alarm circuit to be activated thus providing a positive voltage at the collector of transistor 102 for activating an alarm device. Referring again to enable switching transistor 124, the base of the transistor is connected through a resistor 126 to its emitter and through a resistor 128 to an output of sensing monitor circuit 202 as will be explained in more detail hereinafter.

HIGH ALARM CIRCUIT

The output of reversal rate circuit 65 is also connected through a resistor 111 to a Schmitt trigger circuit 110 in high alarm circuit 109. The signal is connected to the base of PNP transistor 112 and to the cathode of a diode 118 which has its anode connected through a resistor 116 to the collector of an PNP transistor 114 that forms a Schmitt trigger with transistor 112. The base of transistor 114 is connected to the collector of transistor 112 and through a resistor 117 to voltage source $+v_4$. The emitter of transistor 112 is connected through resistor 122 to a voltage source $+v_3$ and also through a resistor 120 to the collector of switching transistor 124. Thus when transistor 124 is on, a path to ground is provided for transistor 112 and the high alarm circuit is thereby enabled. As in the operation of the low alarm circuit the high alarm circuit is activated in an analogous manner; that is, when the signal through resistor 111 goes above the voltage applied to the emitter of transistor 112 by threshold biasing resistors 120 and 122, transistor 112 will go low thus causing transistor 114 to conduct and provide a high output at the collector of transistor 114 that is applied to the base a current amplifier NPN transistor 230 through a resistor 214. The collector of transistor 230 is connected to voltage source $+v_4$ and its emitter is connected to a warning device such as a lamp 232. The lamp acts as a caution light and provides a visual indication that the steering wheel reversal rate is excessive. It will be noted that the low alarm circuit 79 and the high alarm circuit 109 are similar except in the respect that the input transistor of each Schmitt trigger are PNP and NPN respectively.

COUNTER

The reversal pulses from interface 1 speeded up by capacitor 24 and amplified by transistor 26, that appear on line 9 from the junction of the collector of transistor 26 and the emitter of transistor 30 are applied to the input of counter 204 and also to the toggle input of flip flop 184 in the evaluate circuit 179. The purpose of the latter connection will be explained hereinafter. Counter 204 consists of eight binary flip flops 206 through 220 connected as a straight 8-bit BCD counter having a 256 count capacity. This should be adequate to store the reversals of any driver over the three minute sampling period. The pulses on line 9 are applied to the toggle input of the first flip flop 206. The remaining inputs to the input flip flop 206 counter 204 are both connected to an output of the evaluate flip flop 184. As will be explained hereinafter, when flip flop 184 output is low no pulses will be counted into counter 204, but when that output is high the pulses will be counted into the counter 204. Outputs from the last five flip flops 212 through 220, the most significant bits, are applied to the digital-to-analog (D/A) converter, which is of conventional design. Only the five most significant bits are applied to the converter because a greater degree of resolution is not required.

SPEED AMPLIFIER AND THRESHOLD

A conventional speedometer pickup including a coil and rotating magnet 130 provides an AC signal whose frequency depends on the speed of the vehicle. The coil is connected between ground and a coupling resistor 131 that couples the alternating signal to the base of an NPN transistor that acts as an over-driven amplifier. The emitter of the transistor is connected to ground, the base is further connected to voltage source $+v_2$ through biasing resistor 138 and the collector is also connected to the voltage source $+v_2$ through a biasing resistor 140. Because the amplifier operates in an over-driven mode the signal appearing at the collector of transistor 132 is a clipped or limited version of the input AC signal and is therefore essentially a rectangular wave signal. That collector signal is applied through a series combination of a capacitor 142 and a diode 146 having its cathode connected to the capacitor. The junction of the capacitor 142 and diode 146 is connected to the anode of a diode 144 which has its cathode connected to ground, thereby passing the positive portion of the rectangular wave form to ground; thus the signal at the cathode of diode 146 is the negative portion of the rectangular wave form. This signal is connected to a capacitor 148 which is further connected to ground. The capacitor charges up providing a signal at the junction of the capacitor and diode 146 that is a voltage proportional to the speed of the vehicle as determined by the frequency generated by the rotating magnet device 130. That voltage is coupled through a coupling resistor 150 to the base of an NPN switching transistor 166 which has its emitter connected to ground and its collector connected to voltage source $+v_1$ through a load resistor 170. The base of the transistor is biased through biasing resistor 168 to the voltage source $+v_1$. Transistor 166 is normally on or conducting, thus the junction between the collector and resistor 170 would be low. When the voltage input to transistor 166 exceeds a minimum level the transistor will then turn off causing the junction point between the collector and resistor 170 to go high. That high or low signal is connected to the reset circuit 153.

If the vehicle is already equipped with a speed threshold device, it may, of course, be used to provide the required signal in place of the circuit just described.

RESET CIRCUIT

The reset circuit 153 consists essentially of an NPN switching transistor 172 having its emitter connected to the junction of the collector of transistor 166 and resistor 170. The collector of switching transistor 172 is connected to the junction of a series connection of a resistor 174 and a capacitor 176 connected with the resistor to voltage source $+v_1$ and the capacitor to ground. A reset switch 178 is connected between the junction of resistor 174 and capacitor 176 on one hand and ground on the other hand. This junction point is further connected to the reset inputs of flip flops 206 through 220 of counter 204 and also to the reset inputs of evaluate flip flop 184 and sense mode flip flop 202. Closure of switch 178 results in resetting all of the above-mentioned flip flops. As will become apparent in the discussion immediately following, braking the vehicle at the same time the speed is below the minimum point, that is when the voltage produced by the speed sensing unit is such that transistor 166 is turned off, transistor 172 will turn on thus providing a ground path from the collector of transistor 172 to ground there a resistor 164 thereby resetting the aforementioned flip flops. Line 152 is connected to the brake light circuit of the vehicle and a voltage $+v_4$ appears on line 152 when the brakes on the vehicle are applied. The voltage on line 152 is connected through a noise filter including a resistor 156 in series with a capacitor 158 to ground. The junction of the resistor and capacitor is connected to a current limiting resistor 162 and then to the base of transistor 172. The junction of the transistor base and resistor 162 are connected to ground through a resistor 164 which provides return leakage for the transistor current. When $+v_4$ appears on line 152, transistor 172, which is normally off, tends to turn on, but will not do so if transistor 166 is off. Thus braking while the vehicle is exceeding the minimum speed necessary to keep transistor 166 on will not cause transistor 172 to conduct and thereby reset the unit. However, if transistor 166 is on, presence of voltage $+v_4$ on line 152 will turn transistor 172 on, thereby providing a ground path for the reset line and resetting all of the above-mentioned flip flops.

EVALUATE CIRCUIT

The junction of the collector of transistor of 166 and resistor 170 is further connected to the evaluate circuit 179. As will be recalled, that junction point is high when the minimum vehicle speed is exceeded and is low for speeds below that value. The signal is connected to input 1801 of a NAND gate 180 which receives a second input at 1802 from an output of the flip flop 202 that will be described hereinafter. Input 1802 to the NAND gate from the flip flop 202 will normally be high, thus when a high input is received from the speed amplifier and threshold circuit 131, the output of NAND gate 180 will be low. The NAND gate 180 output is connected to an inverter 182 thereby providing a high output to input 1841 of a JK flip flop 184. Toggle input 1842 of JK flip flop 184 is connected to the junction of the emitter of transistor 30 and the collector of transistor 26. As will be recalled, this is the same point that it connected to the counting input of counter 204. The purpose of connecting the pulses appearing at this point to the toggle input 1842 of flip flop 184 is merely to provide some means for switching the flip flop between its two states. Any means providing pulses to switch the flip flop would be acceptable, however, it is convenient to use these pulses as they are available in the circuit. Normally the second input 1843 to flip flop 184 will be low thus when the other output is high, a condition which occurs when the vehicle's speed is above the predetermined minimum, the flip flop output will be such that output 1844 connected to the input of flip flop 206 will be high and its second output 1845 will be low. The last mentioned output 1845 is connected through a resistor 183 to a timer circuit 185. When the flip flop output 1844 connected to the input of the counter is high the counter will be activated and the reversal pulses received from VCOS 21 will be counted into the counter. However, when flip flop 184 receives a high input to its second input 1843 and a low input to its first input, 1841 the output 1844 to the counter will be low thus not permitting any further inputs into the counter.

TIMER CIRCUIT

The output from the second output 1845 of evaluate flip flop 184 through coupling resistor 183 is applied to the timer at the base of an NPN transistor 186. The transistor is biased such that it will turn off when the input to the base from flip flop 184 is low. The collector of transistor 186 is connected in series with a resistor 187 and a capacitor 188 to ground and the emitter of transistor 186 is connected to ground. The junction point between resistor 187 and capacitor 188 is connected to voltage source $+v_2$ through a resistor 198. Thus when the transistor is off, capacitor 188 will slowly charge from the voltage source $+v_2$ through charging resistor 198. The junction of resistor 198 and capacitor 188 are connected to the anode of a programmable unijunction transistor 190 which has its cathode connected to ground through a resistor 192. The gate of device 190 is connected to the junction of series resistor 196 and 194 that are connected between voltage source $+v_2$ and ground respectively. When the charge on capacitor 188 exceeds the threshold level determined by resistors 196 and 194, the unijunction transistor will fire thereby providing a sharp negative pulse through a capacitor 200 to the asynchronous input 2021 of flip flop 202 in the sensing monitor circuit.

SENSING MONITOR CIRCUIT

The sensing monitor circuit consisting essentially of a JK flip flop 202 that receives the aforementioned negative spike pulse at its asynchronous input, which thereby forces the flip flop into its reset condition. There is no toggle input to this flip flop and the two switching inputs 2022 and 2023 are connected to ground. When the flip flop is reset the normally low output 2024 that is connected to input 1843 of evaluate flip flop 184 and is also connected to enable transistor 124 through resistor 128 switches from high to low and the other output 2025 which is connected to one of the inputs of NAND gate 180 switches from low to high. The effect of this switch is as follows: the NAND gate 180 will have high and low inputs thus providing a high output which is inverted to provide a low input to flip flop 184; the other input to flip flop 184 will be high thus causing the flip flop to change conditions when toggled by the pulse inputs to thereby provide a low output to the counter 204 and a high output to transistor 186 causing the counter to cease counting and causing the timer to cease counting and to discharge capacitor 188 through transistor 186. In addition transistor 124 will be turned on thus providing a ground path for the high and low alarms and thereby enabling them. Output 2025 of flip flop 202 is further connected to a sensing indicating circuit that lights a lamp 240. The function of this circuit is merely to indicate that the sensing mode of the unit is taking place. The sensing light circuit includes a pair of NPN current amplifying transistors 236 and 238. The high signal from flip flop 202 is connected through a diode 250 and a resistor 246 to the base of transistor 236. The junction of the diode cathode and resistor 246 is connected through resistor 248 to voltage source $+v_1$. The emitter of transistor 236 is connected to ground and the base is also connected to ground through a resistor 244. The collector of transistor 236 is connected to the base of transistor 238 and through a resistor 242 to voltage source $+v_4$. The collector of transistor 238 is connected to voltage source $+v_4$ and its emitter is connected to a lamp 240 which is further connected to ground.

DIGITAL EMBODIMENT

FIG. 3 is a block diagrammatical view of an alternative embodiment of the automatic driver alertness aid according to the present invention. The circuit operates on the same basic principle as the circuit of FIG. 1. However, certain analog functions are performed digitally in this embodiment. Speed amplifier and threshold circuit 131 functions as in FIG. 1, providing a high output to control and reset circuit 153 when the frequency of the speedometer signal on line 129 exceeds a predetermined minimum. A signal from the vehicle brake light circuit is also applied to control and reset circuit 153 over line 152. Also a reset switch 178 is connected to the control and reset circuit 153. Upon the vehicle speed exceeding the predetermined minimum, timer 185 is enabled by the control and reset circuit and the timing period, typically three minutes, begins to run. Until the 3 minute period has ended, inhibit signals are provided to a low alarm enable flip flop 262 and a high alarm enable flip flop 264. In their inhibited states, these flip flops prevent any alarm signals from being shown or displayed at low alarm 79 or high alarm 109. As in FIG. 1, steering wheel reversal pulses are provided on line 7 from a reversal switch interface 1 that is connected over lines 3 and 5 to steering wheel switches 2 and 4, respectively. The reversal pulses are applied to the left shifting input of a left-right shift register 252. An initial pulse is preinserted into the shift register 252 at the point marked X in the figure. An up OR-gate 254 has lines connected to several sections of the lefthand side of the shift register 252. The OR-gate output is connected to the up input of a conventional up/down counter 258. A down OR-gate 256 is connected to several sections of the left-right shift register toward the righthand side of the register. The output of the down OR-gate is connected to the down input of up/down counter 258. The up/down counter may have any initial count stored in it. It will be noted that the up/down counter is enabled at the same time that the low alarm and high alarm flip flops are disabled, thus the counter is operative only during the timing period of timer 185. A clock generator 260 provides a clock input to the up-down counter 258. The digital output of up/down counter 258 is applied in parallel to a summing amplifier 266 that drives a voltage controlled oscillator (VCO) 268 that provides a pulse output whose pulse rate is related to the voltage input to the VCO. The VCO output is applied to the right shifting input of left-right shift register 252. Thus steering wheel reversal pulse will tend to shift the initial stored pulse to the left and pulses from the VCO will shift the initial pulse input to the right in the shift register. If the reversal pulses and the VCO pulses are being applied at the same rate, then the initial pulse in the shift register will tend to remain essentially stationary. However, if more left pulses are received than right pulses, the pulse will shift to the left and will eventually provide an output on one of the lines to the up OR-gate 254 and by doing so will increase the count in up/down counter 258, thus causing a higher output from summation amplifier 266 and increasing pulse rate output from VCO 268. Thus the pulse will tend to be shifted again to the right. If however the VCO pulses are being applied at a higher rate than the steering wheel reversal pulses, the initial pulse in the shift register will shift to the right and will eventually cause an input to one of the lines to down OR-gate 256 which will provide a down count to up-down counter 258 thereby reducing the input to VCO 268 and reducing the pulse output from the VCO. Thus the pulse will tend to be shifted back to the left. Thus there is essentially a feedback loop action that will tend to maintain the initial pulse in a position neutral to the up and down OR-gates and by doing so a count will be stored in the up-down counter that is related to the average steering wheel reversal rate received during the timing period of timer 185. Thus at the end of the timing period up/down counter 258 will have stored the vehicle operator's reversal rate that will then be used for comparison to his dynamic reversal rate during the remainder of the trip. As the 3 minute period ends the high and low alarms 262 and 264 will be enabled and the up/down counter will be inhibited from further counting. The pulse rate from VCO 268 will remain constant and as the steering wheel reversal pulse rate on line 7 increases or decreases the pulse in shift register 252 will move to the left or to the right of the shift register, thus indicating an increase or decrease of the vehicle operator's steering wheel reversal rate. While the alarm outputs are shown being taken at the end of the shift register, they may be taken at any point at the left and right portions of the shift register depending on how sensitive the alarm system is desired to be. Assuming the pulse reaches the right hand side of the shift register, outputs will be applied to the two inputs of flip flop 262 thus causing the signal output to go high and activating low alarm 79; at the same time a left shifting signal will be applied to the left-right shift register in order to move the pulse back to the left. As long as the steering wheel reversal rate continues to be abnormally low, the pulse will continue to go to the end of the shift register and the alarm will continue to be displayed. However, since it is continually being shifted to the left by the signal from the enable flip flop 262, the pulse will remain in the shift register. A similar function is provided at the reverse end of the shift register in order to activate the high alarm 109. Thus it can be seen that the embodiment shown in FIG. 3 is a digital approach that is conceptually similar to the embodiment shown in FIG. 1.

I claim:

1. In a vehicle having a steering member, automatic driver alertness apparatus comprising:
reversal sensing means for generating a first signal that is a function of the number of reversals of said steering member;
memory means responsive to said first signal for generating and storing a substantially constant reversal rate signal that is a function of the steering member reversal rate occurring during a first time period; and
alarm means responsive to said first signal and said reversal rate signal subsequent to said first time period for providing an alarm signal when the time averaged rate of said reversals substantially falls below the stored reversal rate.

2. Apparatus according to claim 1 further comprising means responsive to said first signal and said reversal rate signal subsequent to said first time period for providing an alarm signal when the time averaged rate of said reversals substantially exceeds the stored reversal rate.

3. In a vehicle having a steering member, a speedometer linkage and a brake light circuit, automatic driver alertness apparatus comprising
means for generating a pulse train signal in response to the reversals of said steering member,
means responsive to said speedometer linkage for providing a signal when said vehicle exceeds a predetermined speed,
means initiated by said speed signal and responsive to said reversal signal for determining the steering member reversal rate during a predetermined time period, storing said reversal rate, and providing a signal representative to said reversal rate, and
means operative subsequent to said time period and responsive to said reversal signal and said stored reversal rate signal for providing a first alarm signal when the rate of said reversals substantially exceeds said stored reversal rate and a second alarm signal when the rate of said reversals is substantially less than said stored reversal rate.

4. The apparatus of claim 3 further comprising means connected to said brake light circuit and responsive to said speed signal for providing a reset signal to said rate determining means when said brake light circuit is activated in the absence of a speed signal.

5. The apparatus of claim 3 wherein said rate determining means includes
clock means responsive to said speed signal for providing a signal a predetermined time after the initial receipt of said speed signal,
counter means initiated by said speed signal and responsive to said reversal signal and timing signal for counting the pulses in said pulse train until said timing signal is received, and
means for generating a control signal proportional to the count in said counter.

6. The apparatus of claim 5 wherein said alarm means includes
means responsive to said control signal and said reversal signal for generating a second train of pulses having pulse widths proportional to said control signal,
means responsive to said second train of pulses for integrating said pulse train over a predetermined time period to provide an output signal,
means responsive to a predetermined high level of said output signal to provide said first alarm signal, and
means responsive to a predetermined low level of said output signal to provide said second alarm signal.

7. Apparatus according to claim 3 wherein said rate determining circuit includes.
left-right shift register means having a pulse initially centrally located therein,
up/down counter means activated by said speed signal,
clock generator means for providing clock pulses to said counter means,
means for applying up count pulses to said counter means when said pulse is in the left hand portion of said counter means,
means for applying down count pulses to said counter means when said pulse is in the right hand portion of said counter means,
oscillator means responsive to said counter for providing a pulse train having a repetition rate dependent on the count in said counter,
means for applying said reversal signal to the left shifting input of said shift register means,
means for applying said oscillator pulse train to the right shifting input of said shift register means, and
timer means for inhibiting further counting in said counter means after the lapse of a predetermined time period.

8. The apparatus of claim 6 wherein said alarm means includes
means operative subsequent to said time period and connected to said shift register means for activating said first alarm when said pulse is at the one end of said shift register means, and
means operative subsequent to said time period and connected to said shift register means for activating said second alarm when said pulse is at the opposite end of said shift register means.

9. In a vehicle having a steering member, automatic driver alertness apparatus comprising:
means for generating a signal that is a function of steering member reversals;
means for selectively storing a reversal rate;
means responsive to said signal and to said stored reversal rate for generating pulses in response to said signal, said pulses having a pulse width proportional to the magnitude of said stored reversal rate;
capacitor means receiving said pulses for providing a capacitor charge voltage; and means for providing an alarm signal when said voltage becomes less than a predetermined value.

10. A combination of claim 9 further comprising:
means for providing an alarm signal when said voltage exceeds a predetermined value.

11. The combination of claim 1 wherein the first signal generated by said reversal sensing means comprises a pulse train having a rate proportional to the number of steering member reversals and said memory means comprises means for counting the pulses in said pulse train during said first time period and for holding said count to provide said stored reversal rate signal.

12. The combination of claim 11 wherein said alarm means comprises means for altering the width of the pulses in said pulse train in accordance with the magnitude of said stored reversal rate signal; and further comprising capacitor means receiving said pulses for providing a capacitor charge voltage; and means for providing said alarm signal when said voltage becomes less than a predetermined value.

* * * * *